Jan. 8, 1957 O. J. SCHORER 2,776,840
DRILL STEEL RETAINER ASSEMBLY
Filed Feb. 2, 1955

OTTO J. SCHORER
INVENTOR.

BY *Daniel H. Bohio*
*atty*

United States Patent Office 2,776,840
Patented Jan. 8, 1957

2,776,840

DRILL STEEL RETAINER ASSEMBLY

Otto J. Schorer, Northampton, Mass., assignor to Worthington Corporation, Harrison, N. J., a corporation of Delaware Application February 2, 1955, Serial No. 485,743

8 Claims. (Cl. 279—19.3)

The present invention relates to drills and more particularly to chuck assemblies which transmit rotation to the drill steel.

In a common type chuck assembly for transmitting rotation from a driving means to a drill steel, a drill steel having extensions thereon is disposed within a chuck drive ring. The drive ring is provided with ribs on the inner periphery thereby adapted to engage the drill steel extensions to rotate the drill steel and drill a hole in a hard material such as rock, or the like.

When it is desired to remove the drill steel from the drilled hole, it is often necessary to rotate the drill steel to prevent it from binding in the hole as commonly occurs in very hard materials such as rock or the like. However, since the tip or bit of the drill steel is no longer in contact with the hard material in the bottom of the drilled hole, inertia causes the drill steel extensions to lose contact with the drive ring ribs and to continue to rotate or spin beyond the point of positive rotation by the ribs. Thus, due to inertia, the drill extensions rotate relative to the drive ring ribs and the drill steel is sometimes lost or ejected from the chuck assembly resulting in a stoppage of the drilling operation until it can be reinserted into the chuck assembly.

In accordance with the present invention, a chuck drill assembly is provided having locking means to prevent the drill steel from being ejected therefrom when rotating the drill steel to remove the drill from a drilled hole.

The invention will be better understood from the following description when considered in connection with the accompanying drawing forming a part thereof and in which.

Figure 1:
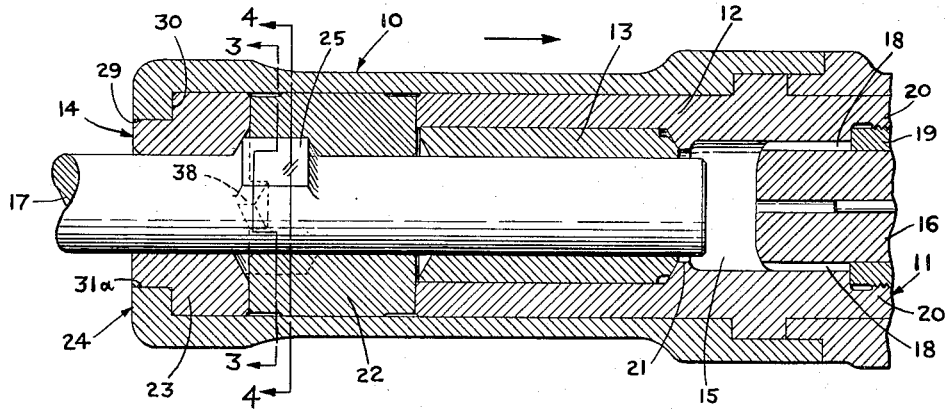
Figure 1 is a longitudinal view in section of the chuck assembly of the present invention with a drill steel disposed in the position it assumes when the steel is being removed from a drilled hole.

Referring to the drawings, the reference numeral 10 designates the housing of a drill for drilling holes in hard materials such as rock and the like. Disposed in the housing is a chuck assembly 11 comprising a chuck sleeve 12, chuck bushing 13 and chuck ring 14.

Sleeve 12 is provided in one end thereof with a cylinder 15 in which is disposed a fluted piston hammer 16 for slidable or reciprocating movement therein. Hammer 16 is reciprocated by drive means (not shown) to deliver percussion blows against the end of drill steel 17 positioned in the chuck assembly and extending into the lower end of cylinder 15. Longitudinally extending flutes 18 disposed on the outer periphery of hammer 16 engage an externally threaded rifle nut 19 arranged on the hammer. Hammer 16 transmits rotative movement to nut 19 through flutes 18. Hammer 16 is rotated by drive means (not shown). Nut 19 is positioned within sleeve 12 adjacent an internally threaded portion 20 thereof and transmits rotative movement to the sleeve through its external threads.

Bushing 13 is press fitted into sleeve 12 and is seated against a shoulder 21 formed on the inner surface thereof adjacent the front end of cylinder 15.

Chuck ring 14 comprises a drive ring 22 and a locking ring 23. Locking ring 23 is positioned in the housing adjacent the front or drill end 24 thereof, and drive ring 22 is positioned therein between the front end of sleeve 12 and the locking ring.

Drill steel 17 extends into end 24 of the housing and through locking ring 23, drive ring 22 and bushing 13, into the front or lower end of cylinder 15. Bushing 13 provides a guide for the drill steel and prevents the steel from extending beyond a predetermined point into the housing. The diameter of the steel is smaller than the internal bore of the rings and bushing to permit steel 17 to slide or reciprocate therein. Radial extensions or lugs 25 are disposed on opposite sides of the drill steel adjacent chuck ring 14.

Drive ring 22 is provided with longitudinally extending teeth or projections 26 (Fig. 2) on each end thereof. Teeth 26 are spaced circumferentially of the ring 90 degrees apart.

Figure 5:
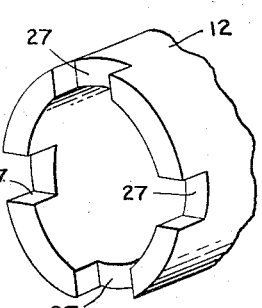
Figure 5 is a perspective view of the end portion of the chuck sleeve connected to the chuck ring of the present invention.

Teeth 26 are adapted to be positioned in longitudinally extending slots or jaws 27 (Figs. 2 and 5) disposed in the adjacent ends of locking ring 23 and sleeve 12, 90 degrees from one another, and in alignment with said teeth. Thus, rotative movement imparted to sleeve 12 through the rifle nut 19 is in turn transmitted to drive ring 22 and locking ring 23 through engagement of teeth 26 in jaws 27. Longitudinally extending ribs 28 (Fig. 2) are disposed on opposite sides of inner periphery of drive ring 22, 180 degree apart, and in alignment with teeth 26. Ribs 28 are triangular-shaped in cross section with the apexes thereof located inwardly of the ring. Ribs 28 extend beyond the opposite ends of the ring to a point substantially coextensive with teeth 26.

Figure 2:
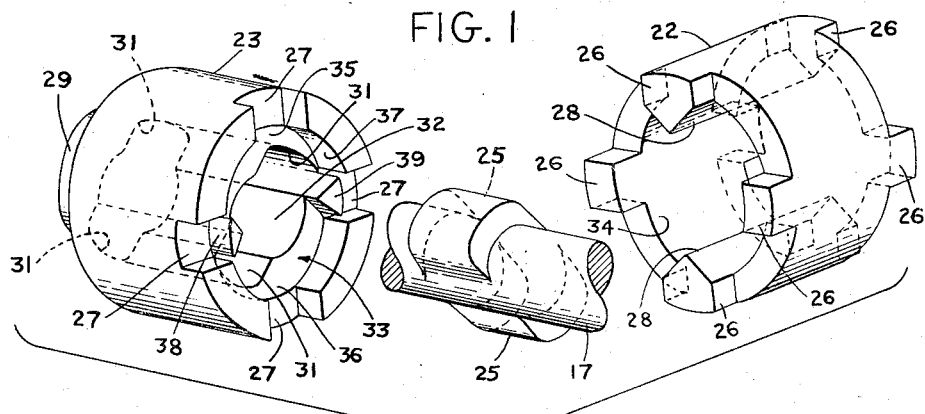
Figure 2 is an exploded view showing the order of assembly of the chuck ring embodied in the present invention.

The locking ring 23 is provided with a reduced portion 29 on the front end thereof to form a shoulder 30 which seats against an inwardly extending flange 31a to prevent the chuck assembly from falling out of housing 10. Longitudinally extending keyways or grooves 31 having substantially the same shape as drill steel lugs 25 are provided on opposite sides of axial bore 32 (Fig. 2) of the locking ring to permit insertion of the drill steel 27 through the ring and into the chuck assembly. Grooves 31 are positioned transversely of the ring between two adjacent jaws 27. The end of ring 23 adjacent the drive ring 22 is provided with a countersink or cylindrically-shaped recess 33 extending therein to a point substantially coextensive with jaws 27. Recess 33 is of substantially the same diameter as drive ring bore 34 (Fig. 2). Transversely extending faces 35 and 36 are formed by the bottom portion of the recess between axial bore 32 and grooves 31, and side wall 37 of recess 33.

Locking lugs or teeth 38 and 39 are disposed on faces 35 and 36, respectively. Lugs 38 and 39 are triangular shaped in cross-section with the apexes thereof positioned inwardly of the ring and extend longitudinally of the recess a distance substantially less than the depth thereof.

Lug 38 is positioned on one end of face 35 in radial alignment with the jaw 27 adjacent thereto while lug 39 is positioned on the opposite end of face 36 in radial alignment with the jaw 27, spaced 180° from said first-mentioned jaw.

Figures 3, 4:
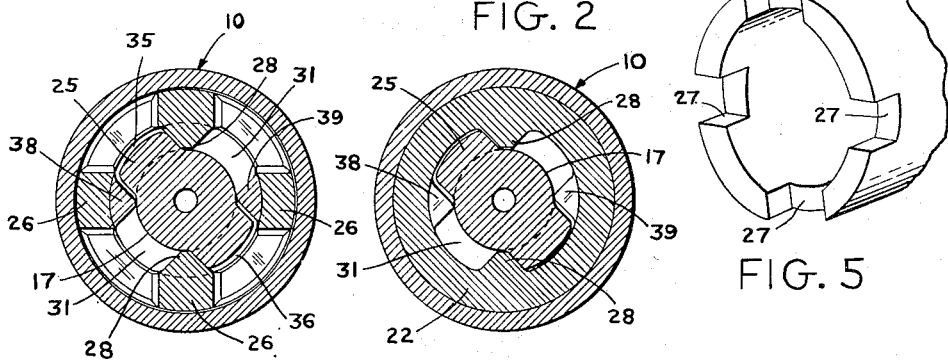
Figure 3 is a section taken on line 3—3 of Figure 1.
Figure 4 is a section taken on line 4—4 of Figure 1.

In operation, when it is desired to perform a drilling operation, drill steel 17 is inserted into the end of the housing by registering lugs 25 with grooves 31 of ring 23 and pushing the drill steel therein until lugs 25 contact bushing 13. Thereafter, the drill steel is turned out of engagement with the grooves 90 degrees until opposite side faces of lugs 25 contact or engage ribs 28 on opposite sides of ring 22, as shown in Figure 4. The drilling operation is then performed by rotative and reciprocating driving means, not shown, which impart a rotative and reciprocating movement to hammer 16, which movement in turn is transmitted to the drive ring, as hereinbefore described, and to the drill steel by ribs 28 which engage lugs 25 thereon.

When it is desired to remove the drill steel from a drilled hole, housing 10 is moved to the right, as indicated by the arrow in Figure 1 (by means not shown), and the drill steel assumes the position as shown in Figure 1 with lugs 25 extending into locking ring recess 33 (Figure 2) and supported on faces 35 and 36 (Figure 3). The portion of one lug 25 in the recess is then positioned therein between one rib 28 and locking lug 38 (Figure 3) while the portion of the other lug in the recess is positioned between the other rib 28 and locking lug 39. The drill steel is then rotated to prevent the drill steel from binding in the hard drilled material and with ribs 28 contacting the opposite side faces of lugs 25 to rotate the drill steel. Since the tip or bit of the drill steel is no longer in contact with the hard material in the bottom of the bored hole, inertia will cause lugs 25 to lose contact with drive ring ribs 28. However, locking lugs 38 and 39 arrest this rotation of the lugs and drill steel caused by inertia, and lugs 25 are prevented from turning into engagement with grooves 31. A force is then continuously applied to move the steel to the right and out of the drilled hole. Thus, in the present invention, the locking lugs 38 and 39 prevent the drill steel from turning into engagement with grooves 31 and being ejected from the chuck assembly when the drill steel is rotated to remove it from the bored hole.

It will be understood that the invention is not to be limited to the specific construction or arrangement of parts shown, but that they may be widely modified within the invention defined by the claims.

What is claimed is:

1. A rotatable chuck ring adapted to receive a drill steel with extensions thereon comprising a locking ring having a plurality of slots in one end thereof, a drive ring having a plurality of longitudinally extending teeth disposed on one end thereof and adapted to extend into said locking ring slots, longitudinally extending ribs disposed opposite one another on the inner periphery of said drive ring, said locking ring having longitudinally extending keyways disposed on opposite sides of the axial bore thereof of substantially the same shape as said extensions, said keyways extending transversely of the ring between adjacent slots disposed therein, said locking ring having a cylindrically shaped recess of substantially the same diameter as the axial bore of said drive ring in the end thereof adjacent said ring slots to form transversely extending faces on opposite sides of the axial bore thereof, and locking means disposed on an opposite end of each of said faces adjacent one of said plurality of slots.

2. A rotatable chuck ring adapted to receive a drill steel with extensions thereon comprising a locking ring having a plurality of slots in one end thereof, a drive ring having a plurality of longitudinally extending teeth disposed on one end thereof and adapted to extend into said locking ring slots, longitudinally extending ribs disposed opposite one another on the inner periphery of said drive ring, said locking ring having longitudinally extending keyways disposed on opposite sides of the axial bore thereof of substantially the same shape as said extensions, said keyways extending transversely of the ring between adjacent slots disposed therein, said locking ring having a cylindrically shaped recess of substantially the same diameter as the axial bore of said drive ring in the end thereof adjacent said ring slots to form transversely extending faces on opposite sides of the axial bore thereof, and locking means disposed on an opposite end of each of said faces in radial alignment with a ring slot adjacent thereto.

3. The chuck ring of claim 2 in which the locking means comprises longitudinally extending teeth substantially triangular-shaped in cross section with the apex thereof extending inwardly of said faces.

4. A rotatable chuck ring adapted to receive a drill steel with oppositely disposed extensions thereon comprising a locking ring having a plurality of slots in one end thereof, a drive ring having a plurality of longitudinally extending teeth disposed on one end thereof and adapted to extend into said locking ring slots, said slots and teeth being spaced 90° apart, longitudinally extending ribs disposed opposite one another on the inner periphery of said drive ring in alignment with said teeth and extending beyond said one end and coextensive with said teeth, said locking ring having longitudinally extending keyways disposed on opposite sides of the axial bore thereof and of substantially the same shape as said extensions, said keyways extending transversely of the ring between adjacent slots disposed therein, said locking ring having a cylindrically shaped recess of substantially the same diameter as the axial bore of said drive ring in the end thereof adjacent said ring slots and coextensive therewith to form transversely extending faces on opposite sides of the axial bore thereof, and locking means disposed on an opposite end of each of said faces in radial alignment with an adjacent slot.

5. The chuck ring of claim 4 in which the locking means comprises longitudinally extending triangular-shaped teeth with the apex thereof being disposed inwardly of said faces.

6. A rotatable chuck assembly adapted to receive a drill steel with lugs disposed thereon comprising a chuck sleeve having a plurality of slots in one end thereof, a bushing positioned in said sleeve, a locking ring having a plurality of slots in one end thereof, a drive ring having a plurality of longitudinally extending teeth disposed on opposite ends thereof adapted to extend into said sleeve and locking ring slots, longitudinally extending ribs disposed opposite one another on the inner periphery of said drive ring, said locking ring having longitudinally extending keyways disposed on opposite sides of the axial bore thereof, said keyways being of substantially the same shape as said drill steel lugs and positioned transversely of the ring between adjacent slots therein, said locking ring being provided with a recess in the end thereof adjacent said slots, and locking means disposed on opposite sides of said recess and adjacent one of said ring slits.

7. A rotatable chuck assembly adapted to receive a drill steel with lugs disposed thereon comprising a chuck sleeve having a plurality of slots in one end thereof, a bushing positioned in said sleeve, a locking ring having a plurality of slots in one end thereof, a drive ring having a plurality of longitudinally extending teeth disposed on opposite ends thereof adapted to extend into said sleeve and locking ring slots, longitudinally extending ribs disposed opposite one another on the inner periphery of said drive ring, said locking ring having longitudinally extending keyways disposed on opposite sides of the axial bore thereof, said keyways being of substantially the same shape as said drill steel lugs and positioned transversely of the ring between adjacent slots therein, said locking ring being provided with a cylindrically shaped recess of substantially the same diameter as the axial bore of said drive ring in the end thereof adjacent said slots to form transverse faces on opposite sides of said axial bore and keyways, and locking means disposed on an opposite end of each of said faces in radial alignment with a ring slot adjacent thereto.

8. A rotatable chuck assembly adapted to receive a drill steel with lugs disposed thereon comprising a chuck sleeve having a plurality of slots in one end thereof, a bushing positioned in said sleeve, a locking ring having a plurality of slots in one end thereof, a drive ring having a plurality of longitudinally extending teeth disposed on opposite ends thereof adapted to extend into said sleeve and locking ring slots, longitudinally extending ribs disposed opposite one another on the inner periphery of said drive ring, said locking ring having longitudinally extending keyways disposed on opposite sides of the axial bore thereof, said keyways being of substantially the same shape as said drill steel lugs and positioned transversely of the ring between adjacent slots therein, said locking ring being provided with a recess in the end thereof adjacent said slots to form transversely extending faces on opposite sides of said axial bore and keyways, and locking means disposed on the opposite ends of said faces adjacent one of said plurality of slots.

References Cited in the file of this patent

UNITED STATES PATENTS

| | | |
|---|---|---|
| 1,968,380 | Curtis | July 31, 1934 |
| 2,385,349 | Curtis | Sept. 25, 1945 |